(12) United States Patent
Schlueter

(10) Patent No.: US 10,280,633 B2
(45) Date of Patent: May 7, 2019

(54) PROFILE SYSTEM

(71) Applicant: Schluter Systems L.P., Plattsburgh, NY (US)

(72) Inventor: Wener Schlueter, Iselohn (DE)

(73) Assignee: Schluter Systems L.P., Plattsburgh, NY (US)

(*) Notice: Subject to any disclaimer, the term of this patent is extended or adjusted under 35 U.S.C. 154(b) by 518 days.

(21) Appl. No.: 14/665,286

(22) Filed: Mar. 23, 2015

(65) Prior Publication Data

US 2015/0191919 A1      Jul. 9, 2015

Related U.S. Application Data

(62) Division of application No. 14/152,029, filed on Jan. 10, 2014, now abandoned.

(51) Int. Cl.
| | |
|---|---|
| *E04F 19/06* | (2006.01) |
| *E04F 19/04* | (2006.01) |
| *E04F 15/02* | (2006.01) |
| *F21V 33/00* | (2006.01) |
| *F21V 21/08* | (2006.01) |

(Continued)

(52) U.S. Cl.
CPC ............ *E04F 19/061* (2013.01); *E04F 15/02* (2013.01); *E04F 19/04* (2013.01); *E04F 19/06* (2013.01); *F21S 4/20* (2016.01); *F21V 21/0808* (2013.01); *F21V 33/006* (2013.01); *H02G 3/36* (2013.01); *E04F 2019/044* (2013.01);

(Continued)

(58) Field of Classification Search
CPC . E04B 5/48; H02G 3/28; H02G 3/286; H02G 3/288; H02G 3/36; H02G 3/38; H02G 3/386; H02G 3/388; E04F 15/02; E04F 19/04; E04F 19/06; E04F 19/061; E04F 2019/0422; E04F 2019/044; F21S 4/20; F21V 21/0808; F21V 33/006; F21Y 2103/10; F21Y 2115/10
USPC ............. 52/220.5; 174/504, 507; 428/96, 97
See application file for complete search history.

(56) References Cited

U.S. PATENT DOCUMENTS

| | | |
|---|---|---|
| 1,930,244 A | 10/1933 | Lewinsohn et al. |
| 1,984,355 A | 12/1934 | Abbott |

(Continued)

FOREIGN PATENT DOCUMENTS

| | | |
|---|---|---|
| AT | 511 325 A4 | 11/2012 |
| DE | 297 09 378 U1 | 7/1997 |

(Continued)

OTHER PUBLICATIONS

German Search Report dated Nov. 6, 2013 in German Application No. 20 2013 100 145.7 with English translation of relevant parts.

(Continued)

*Primary Examiner* — William V Gilbert
(74) *Attorney, Agent, or Firm* — Thorpe North & Western, LLP

(57) ABSTRACT

A profile system for use with structures having a tiled base includes at least one elongate profile that has a base arm, two side arms of the same length projecting from the free ends of the base arm and arranged lying opposite one another, and two terminating arms which project from the free ends of the side arms and are aligned with one another, the side arms being arranged a distance apart from one another and the distance being at least 10 mm.

11 Claims, 3 Drawing Sheets

(51) Int. Cl.
*H02G 3/36* (2006.01)
*F21S 4/20* (2016.01)
*F21Y 103/10* (2016.01)
*F21Y 115/10* (2016.01)

(52) U.S. Cl.
CPC ... *E04F 2019/0422* (2013.01); *F21Y 2103/10* (2016.08); *F21Y 2115/10* (2016.08)

(56) References Cited

U.S. PATENT DOCUMENTS

| | | | |
|---|---|---|---|
| 2,947,093 | A | 8/1960 | Masters |
| 3,667,177 | A | 6/1972 | Biela |
| 4,394,714 | A | 7/1983 | Rote |
| 5,140,506 | A | 8/1992 | Katz |
| 5,157,886 | A * | 10/1992 | Azzar .................. E04F 19/026 52/287.1 |
| 5,165,780 | A | 11/1992 | Katz |
| 5,243,799 | A | 9/1993 | Schlueter |
| 5,323,993 | A * | 6/1994 | Questel ............ B29C 45/14778 211/105.1 |
| 5,336,849 | A | 8/1994 | Whitney |
| 5,514,834 | A * | 5/1996 | Zimmerman ....... H02G 3/0425 174/504 |
| 5,732,747 | A | 3/1998 | Holliday |
| 5,775,016 | A | 7/1998 | Chien |
| 6,345,480 | B1 | 2/2002 | Kemper et al. |
| 6,401,418 | B1 | 6/2002 | Senn et al. |
| 6,591,575 | B2 | 7/2003 | Benedettini |
| 6,727,434 | B2 | 4/2004 | Jadaud et al. |
| 6,745,534 | B2 | 6/2004 | Kornfalt |
| 6,755,550 | B1 | 6/2004 | Lackey |
| 6,911,597 | B2 | 6/2005 | Seamans et al. |
| 6,972,637 | B2 | 12/2005 | Nation |
| 6,990,776 | B2 | 1/2006 | Berman |
| 7,060,893 | B1 | 6/2006 | Villi |
| 7,388,163 | B2 | 6/2008 | Vandervelde et al. |
| 8,197,105 | B2 | 6/2012 | Yang |
| 2003/0029125 | A1 | 2/2003 | Salice |
| 2005/0286247 | A1 | 12/2005 | Peterson |
| 2006/0185295 | A1 | 8/2006 | Gardner |
| 2007/0290475 | A1 | 12/2007 | Reitinger |
| 2008/0066419 | A1 | 3/2008 | Stanchfield et al. |
| 2011/0058353 | A1 | 3/2011 | Yang |
| 2011/0179733 | A1 * | 7/2011 | Picken .................. E04F 19/02 52/242 |
| 2011/0183153 | A1 | 7/2011 | Schlueter |

FOREIGN PATENT DOCUMENTS

| | | |
|---|---|---|
| DE | 297 11 074 U1 | 7/1998 |
| DE | 202 12 950 U1 | 12/2003 |
| DE | 20 2007 011 342 U1 | 11/2007 |
| DE | 20 2009 001 162 U1 | 4/2009 |
| DE | 10 2008 056 958 A1 | 5/2010 |
| DE | 20 2010005347 U1 | 8/2010 |
| DE | 20 2011 104 306 U1 | 10/2011 |
| FR | 2 803 367 A1 | 7/2001 |
| WO | 2011/151272 A1 | 12/2011 |
| WO | 2012/056029 A1 | 5/2012 |

OTHER PUBLICATIONS

German Search Report dated Dec. 19, 2013 in German Application No. 20 2013 100 141.4 with English translation of relevant parts.

* cited by examiner

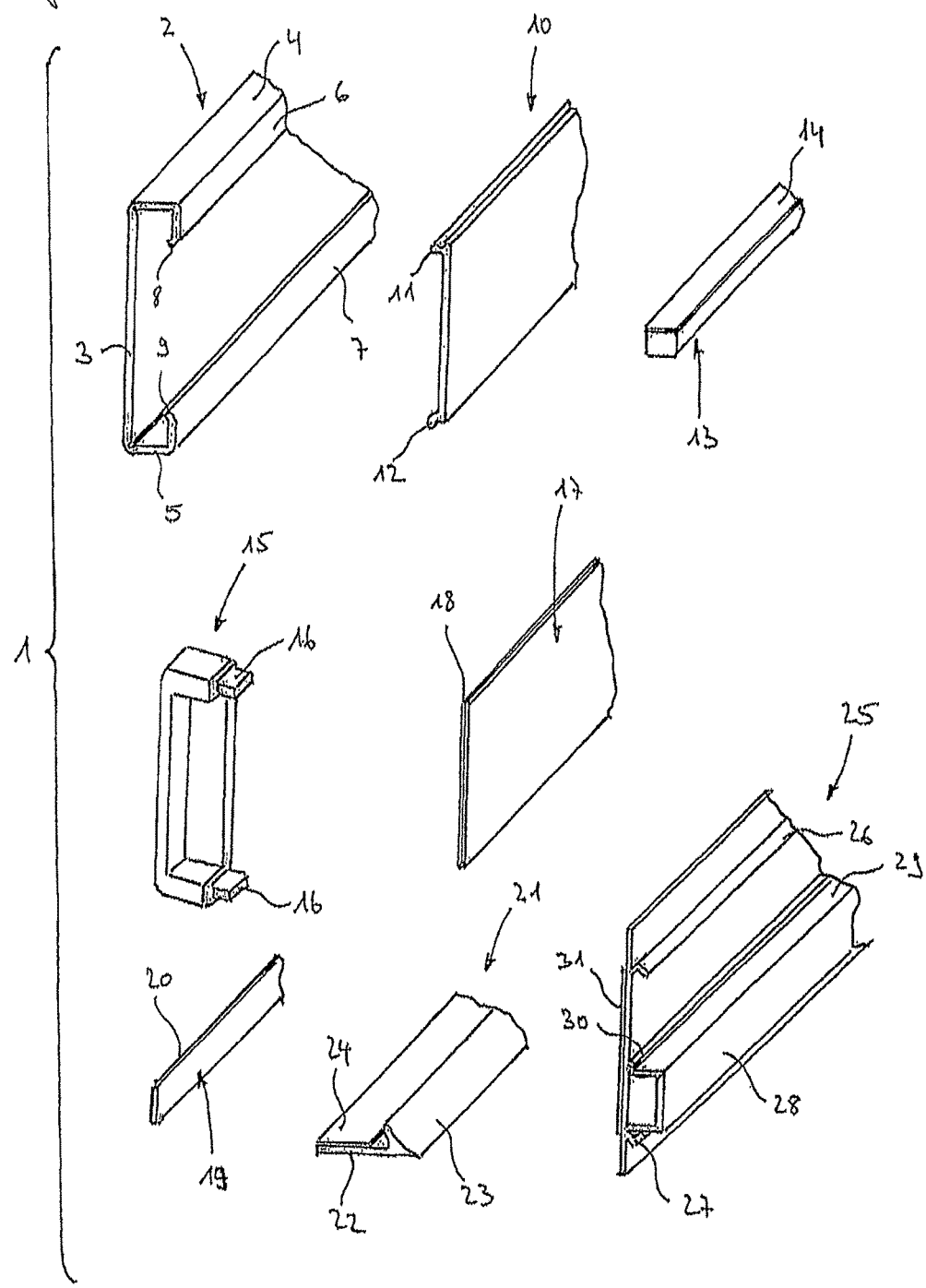

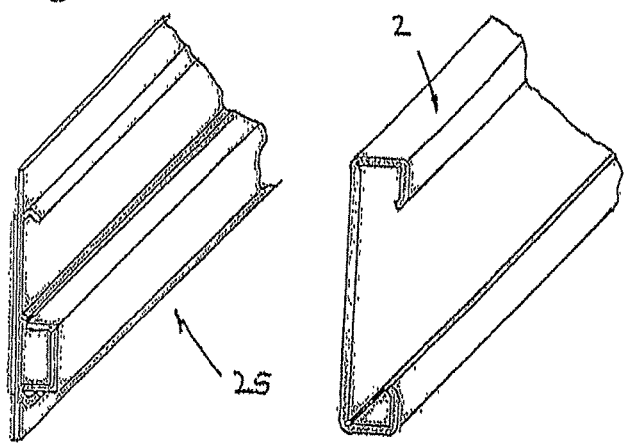
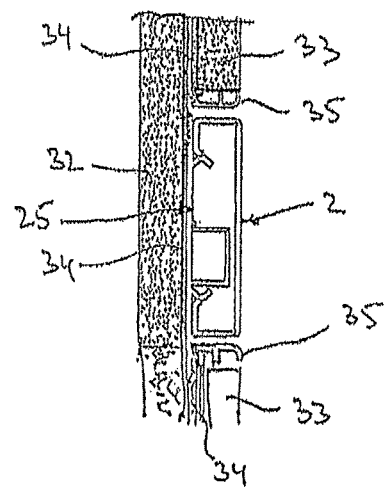
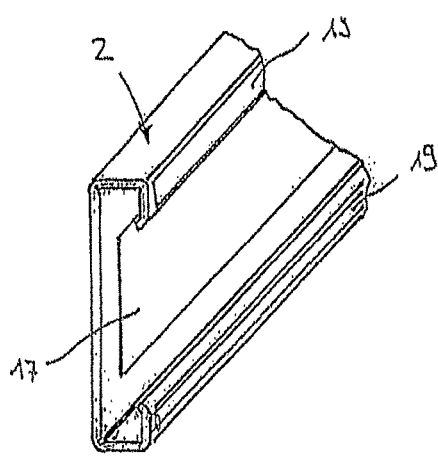
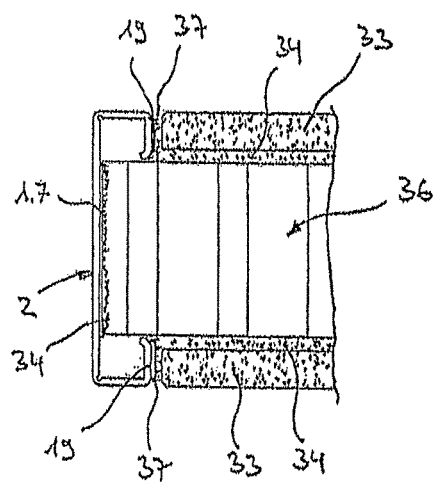

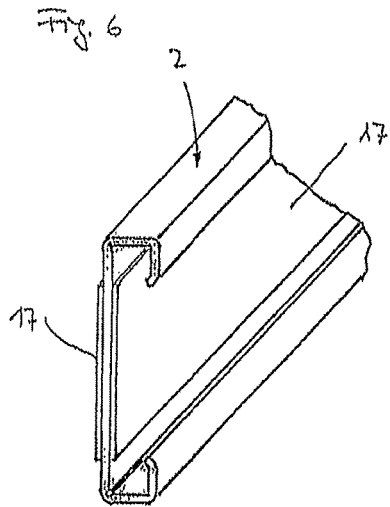
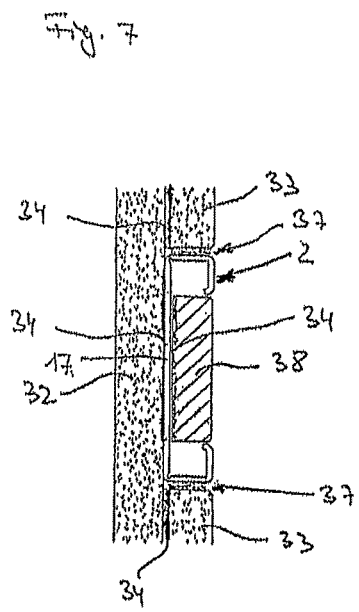
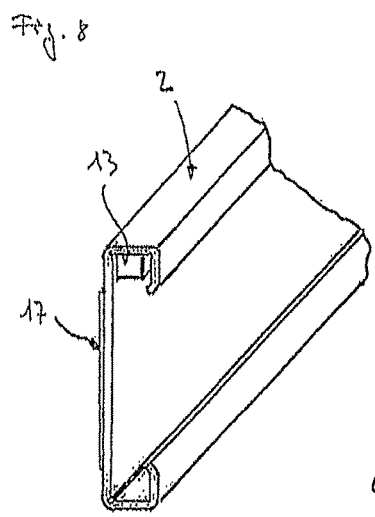
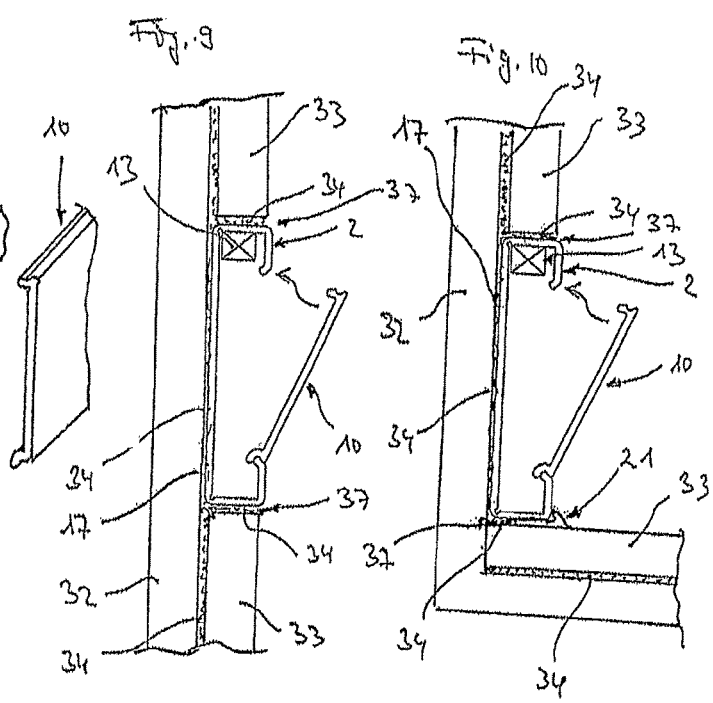

PROFILE SYSTEM

CROSS REFERENCE TO RELATED APPLICATIONS

This application is a divisional of and Applicant claims claims priority under 35 U.S.C. § 120 and 121 of U.S. application Ser. No. 14/152,029 filed on Jan. 10, 2014 which claims priority under 35 U.S.C. § 119 of German Application No. 20 2013 100 142.2 filed Jan. 11, 2013, the disclosures of which are incorporated by reference. A certified copy of priority German Application No. 20 2013 100 142.2 is contained in parent U.S. application Ser. No. 14/152,029.

BACKGROUND OF THE INVENTION

1. Field of the Invention

The present invention relates to a profile system comprising an elongate profile for use with structures having a tiled base, such as for example a tiled wall, a tiled floor or the like.

2. Description of the Related Art

Profiles which are designed for use in structures having a tiled base are known in the prior art in a wide variety of configurations. Their shape is normally adapted to a specific application, such as for example for finishing the outer edges of tile coverings, for creating a smooth cross-over from a tiled surface to an adjacent different floor covering, for example in the form of a carpet, for the smooth connection of floor coverings with different heights, for producing a decorative gap configuration, for providing a decorative strip or the like.

SUMMARY OF THE INVENTION

Proceeding from this prior art it is an object of the present invention to provide a profile system of the type specified at the start having an elongate profile which is designed such that it achieves a wide variety of objectives in association with further profile system components and accordingly can be used universally.

In order to achieve this object the present invention provides a profile system of the type specified at the start that comprises at least one elongate profile that has a base arm, two side arms of the same length projecting from the free ends of the base arm and arranged lying opposite one another, and two terminating arms which project from the free ends of the side arms and are aligned with one another, the side arms being arranged a distance apart from one another and the distance being at least 10 mm. This type of profile forms the base component of the profile system according to the invention and can achieve a wide variety of objectives in association with further profile system components according to the invention, and this is why the profile system according to the invention can be used very universally.

The profile is preferably an extruded profile having a cross-section that remains the same over its entire length. Extruded profiles are advantageous in that they can be produced easily and inexpensively.

The profile is preferably produced from aluminum or stainless steel. Aluminum and stainless steel have on the one hand a very attractive appearance. On the other hand, these materials are resistant to corrosion, and this makes it possible to also use the profile system according to the invention in wet rooms and in outside areas.

Preferably an end section respectively adjoins the terminating arms, the end sections being inclined inwards towards the base arm. End sections formed in this way serve first and foremost to securely connect the profile to further profile system components, as will be described in more detail below.

According to one configuration of the present invention the profile system has at least one fabric or fleece that is fastened or can be fastened to the outside and/or to the inside of the base arm and in particular is formed like a strip. This fabric or fleece serves to form an adhesive base for an adhesive in order to connect the profile adhesively to a base or to a further profile system components.

According to a further configuration of the present invention the profile system has at least one retaining bar which can be fastened to a base and is designed for releaseably holding the profile.

The retaining bar is preferably produced from plastic, in particular as an extruded profile made in one part. It is an advantage of plastic that it is inexpensive. Moreover, the retaining bar can be made to be at least partly flexible, and this is particularly advantageous in order to produce an easily manageable snap-on connection.

An adhesive strip, a fleece producing an adhesive base for an adhesive or a fabric is preferably disposed on the back of the retaining bar in order to fix the retaining bar to a base self-adhesively or using an adhesive.

According to one configuration of the present invention there are projecting from the front side of the retaining bar fastening protrusions which are made such that in the correct state they engage behind the terminating arms and/or behind the end sections of the profile such as to produce a manually releaseable snap-on connection. Accordingly, the profile can easily be clipped onto the fastening protrusions of the retaining bar.

Advantageously, there is formed on the front side of the retaining bar a cable duct which, in the correctly arranged state, is covered by the profile. Accordingly, the retaining profile serves not only to fasten the profile to a base, but can moreover also be used to receive cables or the like.

Preferably, a cover element is provided for closing the cable duct, said cover element in particular being made in one part with the retaining bar. Accordingly, cables stowed in the cable duct can not slide out of the cable duct when the cover element is closed.

According to a further configuration of the present invention the profile system has at least one illuminant fastened or that can be fastened in the profile and at least one elongate diffusion disc cover that is fastened or can be fastened releaseably between the terminating arms and/or the end sections of the profile. Accordingly, the profile system can be used as an illumination system.

The diffusion disc cover preferably has on its inside retaining protrusions which are made such that, in the correctly arranged state, they engage behind the terminating arms and/or behind the end sections of the profile such as to produce a manually releaseable snap-on connection. By virtue of this design the diffusion disc cover can easily be clipped onto the profile.

The illuminant is preferably elongate in form, in particular in the form of a strip or a chain with a plurality of LEDs arranged over the latter.

According to a further configuration of the present invention the profile system has at least one end cap for closing a face side of the profile. This end cap is used when a face side of the profile is arranged such that it can be viewed from the side by an observer.

According to yet another configuration of the present invention the profile system has an elongate sealing lip element that is made such that, in the correctly arranged state, it can be disposed in a gap between the profile and a tile covering adjoining the profile at the side in order to seal the gap. This type of sealing lip element is advantageous when the profile system according to the invention is used to form an inside corner arrangement.

The sealing lip preferably has on at least one side an adhesive strip for securing the sealing lip. Accordingly, the sealing lip can be fitted without any problem.

BRIEF DESCRIPTION OF THE DRAWINGS

Further features and advantages of the present invention, including examples of possible uses, will become clear from the following description of a profile system according to one configuration of the present invention with reference to the attached drawings. These show as follows:

FIG. 1 a perspective view showing individual components of a profile system according to one embodiment of the present invention, the components being able to be combined with one another specifically for different purposes;

FIG. 2 a perspective view showing individual components illustrated in FIG. 1 and which are combined with one another for a first purpose;

FIG. 3 a diagrammatic side view which shows the individual components illustrated in FIG. 2 in the fitted state;

FIG. 4 a perspective view which shows individual components illustrated in FIG. 1 which are combined with one another for a second purpose;

FIG. 5 a side view which shows the individual components illustrated in FIG. 4 in the fitted state;

FIG. 6 a perspective view which shows individual components illustrated in FIG. 1 which are combined with one another for a third purpose;

FIG. 7 a diagrammatic side view which shows the components illustrated in FIG. 6 in the fitted state;

FIG. 8 a perspective view which shows individual components illustrated in FIG. 1 which are combined with one another for a fourth purpose;

FIG. 9 a diagrammatic side view of the individual components illustrated in FIG. 8 in the fitted state; and FIG. 10 a diagrammatic side view which shows the individual components illustrated in FIG. 8 and another of the components illustrated in FIG. 1 in the fitted state.

DETAILED DESCRIPTION OF PREFERRED EMBODIMENTS

FIG. 1 shows different individual components which are or can be part of a profile system 1 according to an embodiment of the present invention.

The profile system 1 comprises as a first component an elongate profile 2 which is made in one part as an extruded profile with a cross-section that remains the same over its entire length and is produced from aluminum or stainless steel. The profile 2 comprises a base arm 3, two side arms 4 and 5 of the same length projecting from the free ends of the base arm 3 and arranged lying opposite one another, two terminating arms 6 and 7 which project from the free ends of the side arms 4, 5 and are aligned with one another, and two end sections 8 and 9 which adjoin one another at the respective terminating arms 6, 7, the end sections 8, 9 being inclined inwards towards the base arm 3. The side arms 4, 5 are arranged a distance apart from one another, the distance being at least 10 mm.

As a second component the profile system 1 comprises an elongate diffusion disc cover 10 which is produced in one part from transparent plastic. On its inside the diffusion disc cover 10 has elongate retaining protrusions 11 and 12 which are made such that, in the correctly arranged state, they engage behind the end sections 8 and 9 of the profile 2 such as to produce a manually releaseable snap-on connection. Accordingly, the diffusion disc cover 10 can be easily clipped onto the profile 2.

The profile system 1 further comprises an illuminant 13 in the form of a strip with a plurality of LEDs arranged over the latter. There is provided on the top of the illuminant 13 an adhesive strip 14 with the aid of which the illuminant 13 can be fastened to a base. In this instance the adhesive strip 14 is arranged such that the light outlet openings of the illuminant 13 are arranged on the side lying opposite the adhesive strip 14.

As a fourth component the profile system 1 comprises at least one end cap 15 which serves to close a face side of the profile 2. The end cap 15 has two clamping protrusions 16 which are made and arranged such that they can be introduced into the profile 2 on the face side and then be held clamped between the inside of the base arm 3 and the insides of the terminating arms 6 and 7.

As a fifth component the profile system 1 comprises strip-like fabric or fleece 17 that is provided on the back with a self-adhesive surface 18 which can optionally be covered with a removeable protective strip (not detailed here). The fabric or fleece 17 is made such that it forms an adhesive base for a pasty adhesive, such as for example for a tile adhesive or the like.

The sixth component of the profile system 1 is also formed by a strip-like fabric or fleece 19 with a self-adhesive surface 20 disposed on its back, the width of the fabric or fleece 19 being adapted to the width of the terminating arms 6, 7 of the profile 2.

A seventh component of the profile system 1 is formed by an elongate sealing lip element 21 which is made such that, in the correctly arranged state, it can be disposed in a gap between the profile 2 and a tile covering adjoining the profile 2 at the side in order to seal the gap. The sealing lip element 21 comprises a sealing lip 23 disposed at the end of a crosspiece 22, there being fastened to the top side of the crosspiece 22 an adhesive strip 24 which serves to fasten the sealing lip element 21 to a side arm 5 of the profile 2.

The final component of the profile system 1 illustrated in FIG. 1 is an elongate retaining bar 25 produced from plastic from the front side of which fastening protrusions 26 and 27 project which are made such that, in the correct state, they engage behind the end sections 8 and 9 of the profile 2 such as to produce a manually releaseable snap-on connection. Accordingly, the profile 2 can easily be clipped onto the fastening protrusions 26 and 27 of the retaining bar 25. There is formed on the front side of the retaining bar 25 a cable duct 28 which serves to receive cables. The cable duct 28 comprises a flexible cover element 29 made in one part with the retaining bar 25 and which can be snapped together behind an elongate retaining protrusion 30, also made in one part with the retaining bar 25 in order to close the cable duct 28. On the back of the retaining bar 25 a strip-like fleece or fabric 31 is provided which serves as an adhesive base for a pasty adhesive, such as for example for a tile adhesive. Accordingly, the back of retaining bar 25 can be secured to a base using an appropriate adhesive.

FIGS. 2 to 10 show different possible combinations of the individual components of the profile system 1 according to the invention illustrated in FIG. 1 and examples of use which can be realised with the respective combinations of the system components.

FIG. 2 shows a combination of the profile 2 and of the retaining bar 25 of the profile system 1 illustrated in FIG. 1, and FIG. 3 shows an example of use of the combination illustrated in FIG. 2 wherein the profile 2 is used as a decorative strip with a cable duct arranged behind it. In order to produce the arrangement illustrated in FIG. 3 a bottom row of tiles 33 is first of all fastened to a base 32 using a tile adhesive 34, an edge defining profile 35 being disposed on the edge side in order to protect the edges of the tiles. These edge defining profiles 35 are basically known in the prior art, and so they will not be described in any more detail at this point. In a further step, the retaining bar 25 is fastened to the base 32 above the edge defining profile 35 by sticking the fleece or fabric 31 disposed on the back of the retaining bar 25 to the base 32 using tile adhesive 34. Next, a further row of tiles 33 is stuck above the retaining bar 25, said row of tiles also being protected on the edge by an edge defining profile 35. In a final step the profile 2 is clipped onto the retaining bar 25 such that the end sections 8, 9 of the profile 2 engage securely behind the fastening protrusions 26, 27 of the retaining strip 25. The outside of the base arm 3 of the profile 2 now serves as a decorative surface behind which the cable duct 28 of the retaining bar 25 is concealed.

FIG. 4 shows a combination consisting of the profile 2 and the strip-like fabric or fleece 19. In this combination the fabric or fleece 19 is stuck by its self-adhesive surface 20 to the inside of the base arm 3. Furthermore, a strip-like fleece or fabric 19 is respectively stuck with its self-adhesive surface 20 to the outside of each terminating arm 6, 7.

FIG. 5 shows an example of use of the combination illustrated in FIG. 4, wherein this combination is used to protect the edge or to screen the side edge of a building board covered with tiles. In order to produce the arrangement illustrated in FIG. 5, in a first step the profile 2 is fastened to a face side of a building board 36 to be covered. For this purpose the fabric or fleece 17 disposed on the inside of the base arm 3 is stuck to the face side of the building board 36 using a tile adhesive 34. In a further step tiles 33 are stuck by means of tile adhesive 34 onto the main surfaces of the building board 36 adjacent to the terminating arms 6, 7 of the profile 2 leaving appropriate gaps 37, the tile adhesive 34 also adhering to the fleece or fabric 19 respectively disposed on the terminating arms 6 and 7 of the profile 2, by means of which further fixing of the profile 2 takes place.

FIG. 6 shows a further alternative combination in which both the outside and the inside of the base arm 3 of the profile 2 are provided with a strip-like fabric or fleece 17.

FIG. 7 shows an example of use of the alternative combination illustrated in FIG. 6 in which the profile system 1 is used as a decorative strip. In order to produce the arrangement illustrated in FIG. 7 a lower row of tiles 33 is first of all stuck onto a base 32 using tile adhesive 34. Next, the profile 2 is fastened to the base above the row of tiles leaving a gap 37 by sticking the fabric or fleece 17 disposed on the outside of the base arm 3 to the base 32 using tile adhesive. Next, a further row of tiles 33 is secured to the base 32 above the profile 2 by means of tile adhesive, likewise leaving a gap 37. In a final step decorative tiles 38 are stuck to the fabric or fleece 17 provided on the inside of the base arm 3 using tile adhesive 34, the height of the decorative tiles 38 being chosen such that it corresponds substantially to the height of the side arms 4, 5 of the profile 2 so that the surface of the decorative tiles 38 ends substantially flush with the surface of the terminating arms 6 and 7 of the profile 2.

FIG. 8 shows a further possible combination of the components of the profile system 1 according to the invention illustrated in FIG. 1 comprising the profile 2, the illuminant 13, the strip-like fleece or fabric 17 and the diffusion disc cover 10, the fleece or fabric 17 being fastened to the outside of the base arm 3 of the profile 2 and the illuminant 13 being held by the adhesive strip 14 on the inside of the upper side arm 4 of the profile 2.

FIG. 9 shows a fitted arrangement of the components illustrated in FIG. 8. In order to produce this arrangement, in a first step a first row of lower tiles 33 is fastened to a base 32 by means of tile adhesive 34. Next the profile 2 is secured to the base 32 by the fleece or fabric 17 using tile adhesive 34 such that the lower side arm 5 of the profile 2 is arranged adjacent to the tiles 33 such as to form a gap 37 and finishes the edges of said tiles in a protective manner. In a further step an upper row of tiles 33 is secured to the base 32 by means of tile adhesive 34 such as to form a gap 37 adjacent to the upper side arm 5 of the profile 2. Finally, the diffusion disc cover 10 is clipped into the profile 2. By means of the arrangement produced in this way an illuminated decorative strip is provided between the rows of tiles.

The arrangement shown in FIG. 10 corresponds substantially to the arrangement according to FIG. 9, the lower row of tiles 33, however, being arranged horizontally and there being provided between the lower row of tiles 33 and the lower side arm 5 of the profile 2 the sealing lip element 21 illustrated in FIG. 1 that is stuck to the lower side arm 5 of the profile 2 by means of the adhesive strip 24 provided on its top. The sealing lip element 21 ensures that no moisture can penetrate between the profile 2 and the lower row of tiles 33 arranged horizontally.

The profile system 1 according to the invention is characterised in particular by its very variable applicability. It should be clear that the possible uses illustrated in the figures only serve as examples and are not restrictive. In fact, the components of the profile system 1 according to the invention illustrated in FIG. 1 can also be combined and used with one another in different ways.

LIST OF REFERENCE NUMBERS 1 profile system
2 profile
3 base arm
4 side arm
5 side arm
6 terminating arm
7 terminating arm
8 end section
9 end section
10 diffusion disc cover
11 retaining protrusion
12 retaining protrusion
13 illuminant
14 adhesive strip
15 end cap
16 clamping protrusion
17 fabric or fleece
18 self-adhesive surface
19 fabric or fleece
20 self-adhesive surface
21 sealing lip element
22 crosspiece
23 sealing lip
24 adhesive strip
25 retaining bar
26 fastening protrusion
27 fastening protrusion 28 cable duct
29 cover element
30 retaining protrusion
31 fabric or fleece
32 base
33 tile
34 tile adhesive
35 edge defining profile
36 building board
37 gap
38 decorative tile

What is claimed is:

1. An assembly comprising:
   (a) a structure having a base comprising a first section covered with tiles and a second section; and
   (b) a profile system fastened to the second section so as to leave a gap between the profile system and the tiles; wherein the profile system comprises at least one elongate profile and at least one fabric or fleece, wherein the at least one elongate profile is produced from aluminum or stainless steel and has a base arm, two side arms of the same length projecting from free base arm ends of the base arm and arranged lying opposite one another, and two terminating arms which project from free side arm ends of the side arms and are aligned with one another, the side arms being arranged a distance apart from one another and the distance being at least 10 mm, and wherein the at least one fabric or fleece is fastened between an inside surface of the base arm of the at least one elongate profile and the second section of the base as an adhesive base for an adhesive connecting the at least one elongate profile adhesively to the base, the fabric or fleece being thereby at least partially concealed between the profile and the second section of the base.

2. The assembly according to claim 1, wherein the at least one elongate profile is an extruded profile having a cross-section that remains the same over its entire length.

3. The assembly according to claim 1, wherein an end section respectively adjoins the terminating arms of the at least one elongate profile, the end sections being inclined inwards towards the base arm.

4. The assembly according to claim 1, further comprising at least one end cap for closing a face side of the at least one elongate profile.

5. The assembly according to claim 1, further comprising an elongate sealing lip element disposed in the gap between the at least one elongate profile and a tile of the tiles in order to seal the gap, said tile laterally adjoining the profile.

6. The assembly according to claim 5, wherein the sealing lip element has on at least one side an adhesive strip securing the sealing lip element to the base.

7. An assembly comprising:
   (a) a structure having a base comprising a first section covered with tiles and a second section; and
   (b) a profile system fastened to the second section so as to leave a gap between the profile system and the tiles; the profile system comprising at least one retaining bar having a back surface, at least one fabric or fleece fastened to the back surface of the retaining bar as an adhesive base for an adhesive connecting the retaining bar adhesively to the base; and
   at least one elongate profile produced from aluminum or stainless steel and having a base arm, two side arms of the same length projecting from free base arm ends of the base arm and arranged lying opposite one another, and two terminating arms which project from free side arm ends of the side arms and are aligned with one another, the side arms being arranged a distance apart from one another and the distance being at least 10 mm;
   the at least one elongate profile being releasably held by the retaining bar.

8. The assembly according to claim 7, wherein the retaining bar is produced from plastic.

9. The assembly according to claim 7, further comprising fastening protrusions projecting from a front side of the retaining bar, wherein said fastening protrusions engage behind the terminating arms of the at least one elongate profile such as to produce a manually releasable snap-on connection.

10. The assembly according to claim 7, further comprising a cable duct formed on a front side of the retaining bar.

11. The assembly according to claim 10, wherein a cover element is provided for closing the cable duct, said cover element being made in one part with the retaining bar.

\* \* \* \* \*